United States Patent [19]
Takeda

[11] 3,975,631
[45] Aug. 17, 1976

[54] STRUCTURES FOR DETECTING FOCAL ADJUSTMENT OF OPTICAL SYSTEMS

[75] Inventor: Hideomi Takeda, Tokyo, Japan

[73] Assignee: Asahi Kogaku Kogyo Kabushiki Kaisha, Tokyo, Japan

[22] Filed: Dec. 11, 1974

[21] Appl. No.: 531,771

[30] Foreign Application Priority Data
Dec. 12, 1973   Japan................................ 48-141024

[52] U.S. Cl............................ 250/211 R; 250/201; 250/204; 250/237 R; 354/25
[51] Int. Cl.²..................... G01J 1/44; H01J 39/04
[58] Field of Search......... 250/201, 204, 209, 211 R, 250/211 J, 237 R; 353/101; 356/4, 123, 125; 352/140; 354/25

[56] References Cited
UNITED STATES PATENTS

| | | | |
|---|---|---|---|
| 3,274,914 | 9/1966 | Biedermann et al............ | 250/209 X |
| 3,562,785 | 2/1971 | Craig.................................. | 250/204 |
| 3,830,571 | 8/1974 | Imai et al........................... | 356/123 |
| 3,875,401 | 4/1975 | Stauffer............................. | 250/201 |

*Primary Examiner*—Eugene La Roche
*Attorney, Agent, or Firm*—Steinberg and Blake

[57] ABSTRACT

Structures to be used during focalizing of an optical system which has a focal plane. A composite photoconductive assembly is situated at the region of the latter focal plane and includes a pair of photoconductive portions, a substrate common to and carrying these photoconductive portions, a light-diffuser situated in front of one of these photoconductive portions for diffusing light which reaches the same, and a light-transmitter situated in front of the other of the photoconductive portions for transmitting non-diffused light thereto. In this way these photoconductive portions generate separate photoelectric outputs in response to diffused and non-diffused light respectively impinging on the above photoconductive portions. An electrical structure is electrically connected with these photoconductive portions for comparing the outputs thereof so as to detect from a comparison of these outputs the focal adjustment of the optical system.

8 Claims, 19 Drawing Figures

STRUCTURES FOR DETECTING FOCAL ADJUSTMENT OF OPTICAL SYSTEMS

BACKGROUND OF THE INVENTION

The present invention relates to optical systems which have a focal plane and in particular to structures for detecting when an image is properly focussed at the focal plane.

Thus, the present invention may be used for detecting the focal adjustment of an optical system of a photographic camera for the purpose of focussing an image of an object which is to be photographed.

It is known to be possible to detect when an optical system of the above type is properly adjusted so as to focus an image at the desired focal plane. For this purpose advantage is taken of a phenomenon known as the dip effect which occurs during variation of the contrast of an optical image when a photoconductive element such as a cadmium sulfide (Cds) element is used to receive light for the purpose of detecting the focal adjustment.

It is well known that this dip effect depends upon three factors, namely, the space frequency, the contrast, and the light intensity of an object such as an object which is to be photographed. As a result, the particular configuration of a dip curve will vary considerably depending upon these factors. When it is required to electrically process such wide variations in a dip curve, the electrical circuitry provided for this purpose must have an extremely wide dynamic range. As a result, problems of variation in the sensitivity of detection of the focal adjustment are encountered.

When utilizing an automatic focalizing device for an optical system of a photographic camera or the like, wherein it is essential to be capable of receiving light which has a relatively wide range of intensity, the desired operation is adversely influenced particularly by the third of the above factors, namely, the variation in brightness or light intensity at the object which is to be photographed.

The influence of the variation in the light intensity upon the dip effect falls into two categories, namely one according to the characteristics peculiar to the particular photoconductive element itself and another according to the particular features of the detecting circuit.

SUMMARY OF THE INVENTION

It is one of the primary objects of the present invention to provide, for detecting focal adjustment, a device which is to a large degree free of the above problems encountered with conventional devices.

In particular it is an object of the present invention to provide a device of this type which is capable of substantially reducing the influence of the variation of light intensity upon the dip effect so as to be capable of detecting the focal adjustment with a high degree of precision independently of variations in the brightness of an object which is to be photographed, for example.

It is also an object of the present invention to provide a structure which is capable of reducing the influence resulting from the particular construction of the detector circuit itself.

Thus, it is one of the more particular objects of the present invention to provide a device of the above general type which is capable of detecting focal adjustment with a high degree of efficiency which does not change substantially even over a wide range of light intensity.

Furthermore, it is an object of the present invention to provide a construction of this type which is capable not only of detecting when an image is properly focussed, but which is also capable of detecting whether the image, if it is not in focus, is front-focussed or rear-focussed.

In accordance with the present invention there is provided for the purpose of focalizing an optical system which has a focal plane, a composite photoconductive means which is situated at the region of this focal plane and which includes a pair of photoconductive portions, a substrate which is common to and carries these photoconductive portions, a light-diffusing means situated in front of one of these photoconductive portions for diffusing light which reaches this one photoconductive portion, and a light-transmitting means situated in front of the other of the photoconductive portions for transmitting non-diffused light thereto. In this way these photoconductive portions of the photoconductive means respectively generate separate photoelectric outputs in response to the diffused and non-diffused light impinging respectively on the above photoconductive portions. An electrical means is connected with these photoconductive portions for comparing the outputs thereof so as to be capable of detecting from this comparison of the outputs the particular focal adjustment of the optical system.

BRIEF DESCRIPTION OF DRAWINGS

The invention is illustrated by way of example in the accompanying drawings which form part of this application and in which.

DECRIPTION OF PREFERRED EMBODIMENTS

Figure 1:
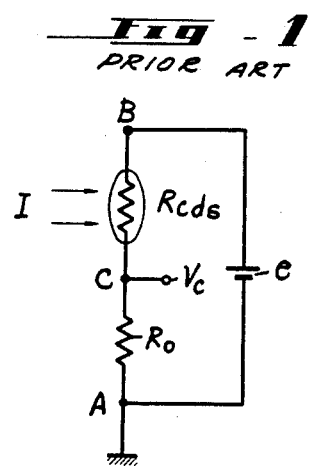
FIG. 1 is a wiring diagram of a conventional circuit for detecting focal adjustment.
Figure 2:
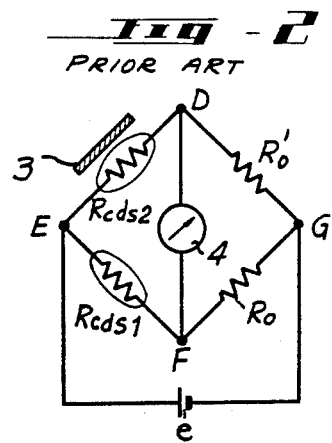
FIG. 2 is a wiring diagram of another known conventional circuit for detecting focal adjustment.

The known detecting circuits for detecting the dip effect may be considered as falling into two types one of which is illustrated in FIG. 1 and the other of which is illustrated in FIG. 2. With the type of dip-effect detecting circuit shown in FIG. 1 there is a CdS element for receiving the light and having an internal resistance $R_{Cds}$, this latter photoconductive element being connected in series with a load resistance $R_o$. The voltage $V_C$ at the junction C between the resistances of FIG. 1 may be detected in the manner shown in FIG. 1. The pair of series-connected resistors of FIG. 1 are connected between the points A and B across which a voltage source $e$ is connected.

With the arrangement of FIG. 2, there is a bridge circuit as illustrated. This bridge circuit includes a pair of photoconductors which are exposed to light, namely a photoconductive element CdS1 having an internal resistance $R_{Cds1}$ and a photoconductive element CdS2 having an internal resistance $R_{Cds2}$, and the bridge circuit has connected with the latter photoconductive elements the load resistances $R_o$ and $R_o'$. As may be seen from FIG. 2, a light-diffuser 3 is situated in front of CdS2, and a galvanometer 4 is connected to the circuit as illustrated. The bridge circuit has the several connection or junction parts D, E, F, and G.

Figure 3:
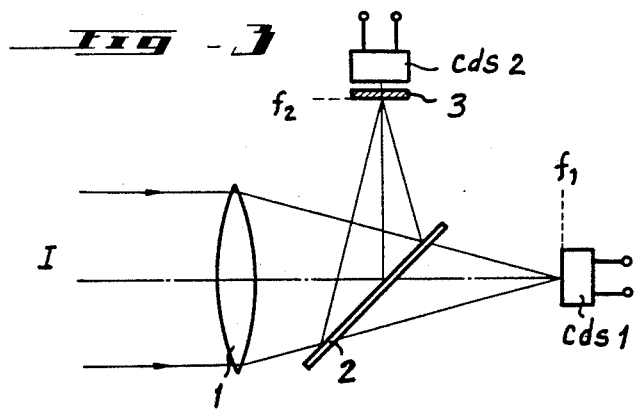
FIG. 3 is a schematic illustration of an optical system utilizing the circuitry of FIG. 2.

A bridge circuit as shown in FIG. 2 is utilized with an optical system as illustrated in FIG. 3. This optical system includes the objective 1, a beam splitter 2, in the form of a semi-transparent mirror, and a pair of focal planes $f_1$ and $f_2$ which are optically identical, these focal planes being provided by splitting of the beam I which travels from the objective 1 to the semi-transparent mirror 2. The photosensitive means CdS1 is situated at the focal plane $f_1$ located behind the mirror 2, so that this particular photosensitive means receives light which travels through the mirror 2. On the other hand, a light-diffuser 3 is situated at the focal plane $f_2$ to receive light reflected by the mirror 2, and after passing through the light-diffuser 3, the light will reach the photoconductive means CdS2, as indicated in FIG. 3.

Referring now to the circuit of FIG. 1, the power P consumed by the load resistance $R_o$ varies in accordance with the variation in the intensity I of the incident light inasmuch as the internal resistance $R_{Cds}$ of the photoconductive element of FIG. 1 varies as the intensity I varies. Assuming that the source voltage $e$ is applied across the points A and B, as illustrated in FIG. 1, then the power P may be expressed as a function of the internal resistance $R_{Cds}$ of the photoconductive element of FIG. 1, in accordance with the following equation (1):

$$P = \left( \frac{e}{R_{Cds} + R_o} \right)^2 R_o \qquad (1)$$

It is well known that the power P assumes its maximum value $P_{max}$ when $R_{Cds} = R_o$ in the above equation (1). According to definition, the dip-detecting efficiency $\eta$ is $$\eta = P/P_{max}. \qquad (2)$$

Substitution of equation (1) into the equation (2) provides:

$$\eta = \frac{4 R_{Cds} \cdot R_o}{(R_{Cds} + R_o)^2} \qquad (3)$$

Figure 4:
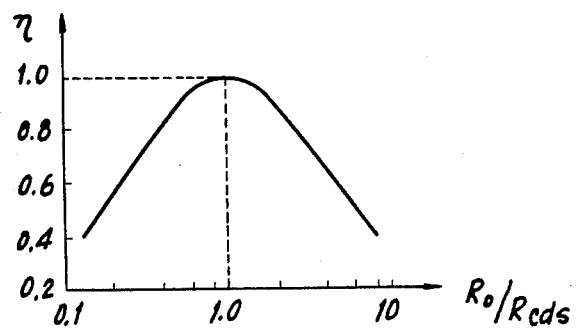
FIG. 4 is a graph illustrating how detecting efficiency varies according to a variation in the ratio between resistances of the type shown in FIGS. 1 and 2.

FIG. 4 illustrates the manner in which $\eta$ varies with the resistance ratio $R_o/R_{Cds}$, the latter forming the abscissa of FIG. 4 while the detecting efficiency $\eta$ is the ordinate. As may be seen from FIG. 4, the dip-detecting efficiency $\eta$ assumes its maximum value at the ratio $R_o/R_{Cds} = 1$, and the efficiency decreases on both sides of this latter ratio. Thus, it is clear that when the dip is detected by a circuit of the above type, the maximum efficiency $\eta = 1$ is established only within a certain relatively small range of light intensity, and the power which may be consumed at other ranges of light intensity is more or less wasted when considered in connection with achieving the maximum efficiency of dip detection. Such a useless consumption of power increases as the resistance ratio $R_o/R_{Cds}$ deviates in both directions from 1, as is apparent from FIG. 4.

Figure 5:
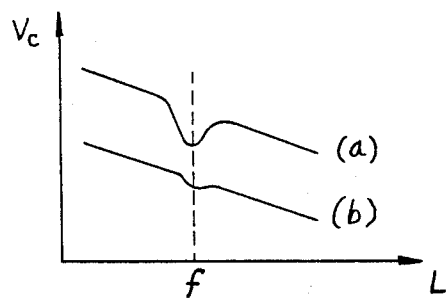
FIG. 5 is a graph illustrating how dip curves vary as a result of variation in light intensity.

FIG. 5 specifically illustrates the variation in dip curve resulting from the variation in light intensity. The dip curve generally includes a component which varies in proportion to $1/L^2$, depending upon the distance L between the objective and the photoconductive element, which may be a CdS element. This component corresponds to the oblique line portion in FIG. 5 and is referred to below as the $1/L^2$ component. The dip curve also includes a dip component which varies in the form of a dip in the vicinity of the location where the image is properly focussed, and depending upon image contrast. When a dip curve of this type is detected by a circuit as shown in FIG. 1, a variation of incident light intensity I brings about a variation of the dip curve as shown by the pair of curves (a) and (b) of FIG. 5. It will be seen from FIG. 5 that these dip curves are substantially parallel to each other along the respective $1/L^2$ components, but they differ from each other with respect to the depths of the dip components, this latter depth being referred to below as the dip height. It is to be noted that in FIG. 5 the abscissa shows the distance L between the objective and the CdS element while the ordinate represents the voltage $V_C$ at the detection point C.

The manner in which the various variable factors mentioned above are related to each other may be schematically represented as follows:

Variation of incident light intensity i → variation of $R_o/R_{Cds}$ → variation of the detecting efficiency $\eta$ → variation of dip height and the $1/L^2$ component.

This variation of the dip curve, which depends upon the incident light intensity, necessarily complicates the processing circuitry which follows the detecting circuit, and simultaneously renders the detecting sensitivity of the focal adjustment undesirably unstable. Such a variation is particularly noticeable in the optical apparatus of a photographic camera where a relatively wide range of light intensity is encountered, so that a processing circuit having a wide dynamic range is required. As a result largely of this latter requirement, the optical apparatus is prevented from being adapted for automatic focus adjustment.

Although a bridge circuit as shown in FIG. 2 is not influenced by the variation of the $1/L^2$ component resulting from the variation of light intensity I as encountered in the above case, inasmuch as the circuit of FIG. 2 is adapted for differential detection of the signal utilizing a pair of photoconductive elements which are exposed to light, the relationship between CdS1, CdS2 and the respective load resistances $R_o$, $R_o'$ remains the same as in the above case, and the detecting efficiency $\eta$ will necessarily vary undesirably. Furthermore, a considerable space is required to accommodate a beam splitter such as the semi-transparent mirror 2 of FIG. 3. The light quantity loss due to this beam splitter cannot be avoided. Also, a difference in the $\gamma$ value between both photoconductive elements which are exposed to light seriously affects the dip variation. The $\gamma$ value corresponds to the $\gamma$ constant in the empirical formula $$R = K I^{-\gamma} \quad (k, \gamma = \text{constants})$$

This latter empirical formula is generally established between the internal resistance $R_{CdS}$ of a CdS element and the intensity of the light beam to which this latter photoconductive element is exposed.

These aspects are extremely disadvantageous for an assembly which is to be incorporated into a compact device such as a photographic camera. The space required to accommodate other mechanical parts included in the automatic focus adjusting device is also severely limited by these disadvantages. All of these disadvantages are avoided by a simple structure and a simple electronic circuit according to the present invention.

Figure 6A:
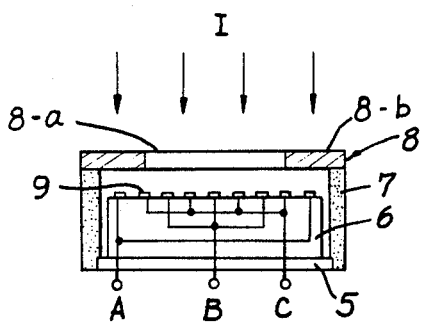
FIG. 6(a) is a schematiic sectional elevation of one embodiment of a composite photoconductive means according to the invention.
Figure 6B:
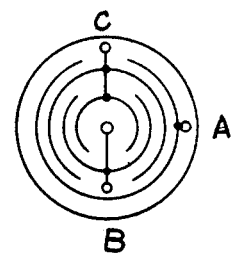
FIG. 6(b) illustrates the manner in which electrodes are arranged in the embodiment of FIG. 6(a)
Figure 6C:
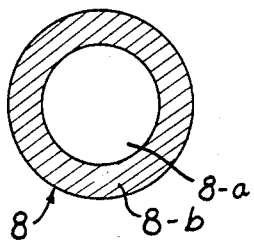
FIG. 6(c) is a plan view of the arrangement of FIG. 6(a) as seen from above, in order to illustrate the relationship between a light-diffuser and a light-transmitter.

FIGS. 6(a)—6(c) illustrate one embodiment of a photoconductive means of the invention which is to be exposed to light in accordance with the present invention. This photoconductive means is a composite photoconductive means in that it has a pair of photoconductive portions, carried by a common substrate, as will be apparent from the description below. Thus, FIG. 6 (a) shows in section a substrate 5 which carries the CdS means 6 and a cap 7 is shown supporting a cover 8 which includes a central light-transmitting means 8a, through which light is directly transmitted without any influence on the light, and a light-diffusing means 8b which serves to diffuse light passing therethrough.

FIG. 6 (c) illustrates how the cover 8 appears from above, the shaded area of FIG. 6 (c) indicating the light-diffusing means while the clear central area indicates the light-transmitting means through which light is transmitted without being diffused. The composite photoconductive means 6 includes the electrodes 9 which are shown in FIG. 6 (a), these electrodes being arranged in a pattern of concentric circles, as indicated schematically in FIG. 6 (b).

Thus, the above assembly includes a composite type of photoconductive structure wherein the photoconductive elements $CdS_{C-A}$ (having internal resistance $R_{C-A}$) and element $CdS_{C-B}$ (having internal resistance $R_{C-B}$) are disposed across electrodes C-A and across electrodes C-B, respectively. Thus the electrode C serves as a common electrode, while the outer electrode structure connected to the terminal A receives only diffused light and the inner electrode structure connected to the terminal B receives direct, non-diffused light. Each of the elements included in this composite type of photoconductive assembly has, accordingly, substantially identical characteristics such as, for example, identical $\gamma$ values. The elements which are exposed to light are arranged in such a way, with respect to the cover 8, that the photoconductive portion $CdS_{C-B}$ is exposed to the light passing through the central light-transmitting means 8a, while the photoconductive portion $CdS_{C-A}$ is exposed only to light which passes through the light-diffusing means 8b. It is to be noted that the relatively thin lines for the photoconductive CdS element 6 shown in section in FIG. 6 (a) illustrate the manner of the connection among the electrodes and correspond to the electrode pattern of FIG. 6 (b).

Figure 7:
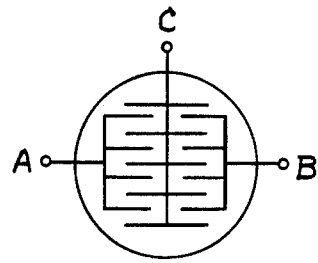
FIG. 7 is a schematic illustration of another arrangement of electrodes of a photoconductive means according to the invention.

However, instead of an electrode pattern where the electrodes extend along concentric circles, as shown in FIG. 6 (b), it is possible to use instead a comb pattern as illustrated in FIG. 7. This arrangement of electrodes as shown in FIG. 7 may be utilized with light-diffusing and light-transmitting means 8'b and 8'a as shown for the cover 8' of FIG. 8. Thus the diffusing portion indicated by shade lines in FIG. 8 will be situated over the electrodes connected to the terminal B and the clear, non-diffusing part of FIG. 8 will be situated over the electrodes connected to the terminal A in FIG. 7.

Of course, other types of patterns may be utilized.

Figure 8:
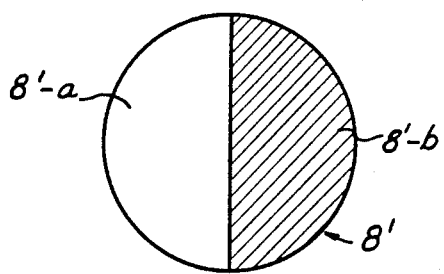
FIG. 8 is an illustration of light-diffusing and non-diffusing components to be used with the embodiment of FIG. 7.
Figure 9:
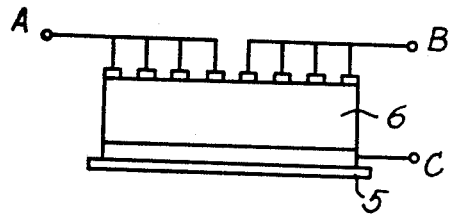
FIG. 9 schematically illustrates yet another arrangement suitable for a photoconductive means according to the invention.

Although a 2-dimension electrode arrangement has been described above, an electrode arrangement of the so-called sandwich type may be utilized as indicated in FIG. 9 where the electrodes connected to the terminals A and B are situated above while the common electrode C is situated below the CdS element 6, and of course with an arrangement as shown in FIG. 9 it is also possible to use the light-diffusing and light-transmitting means of FIG. 8. Thus, the elements which are exposed to light in accordance with the present invention may have various types of electrode patterns and structures, with the above patterns and structures only being shown by way of example.

Figure 10:
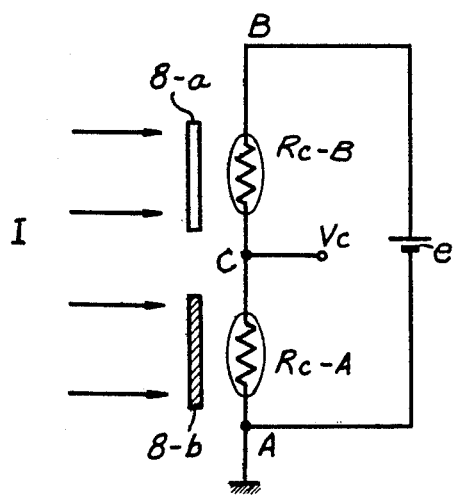
FIG. 10 is a schematic illustration of a detecting circuit according to the invention which utilizes the composite photoconductive means of the present invention.

FIG. 10 illustrates one possible circuit of the invention utilizing the composite photoconductive means of the invention. The points A, B, and C, of FIG. 10 correspond to the electrodes A, B, and C of FIG. 6 respectively. Thus, the photoconductive portions $CdS_{C-A}$ and $CdS_{C-B}$ are exposed to light and have the respective resistance values $R_{C-A}$ and $R_{C-B}$, the latter values depending upon the incident light intensity I. The light-transmitting means 8a is shown in front of the upper and the light-diffusing means 8b is shown in front of the lower photoconductive portions of FIG. 10, respectively. Thus, it will be clear that this arrangement of FIG. 10 corresponds to that of FIG. 6, and of course it is to be understood that the photoconductive means of FIG. 6 (a) and FIG. 10 are situated at the focal plane of the optical system where the image is to be focussed.

With the circuit of FIG. 10, it will be understood that the distance between the objectives and the photoconductive means is maintained constant, so that the resistance values $R_{C-A}$ and $R_{C-B}$ will vary at the same ratio with respect to variations of the incident light intensity I. Therefore, the resistance ratios shown in FIG. 4 will be constant at all times, so that $R_a/R_{Cds} = R_{C-A}/R_{C-B} =$ constant, and therefore the voltage $V_C$ at the point of detection C remains constant. As a result of this feature of the invention the dip-detecting efficiency is maintained constant.

Figure 11:
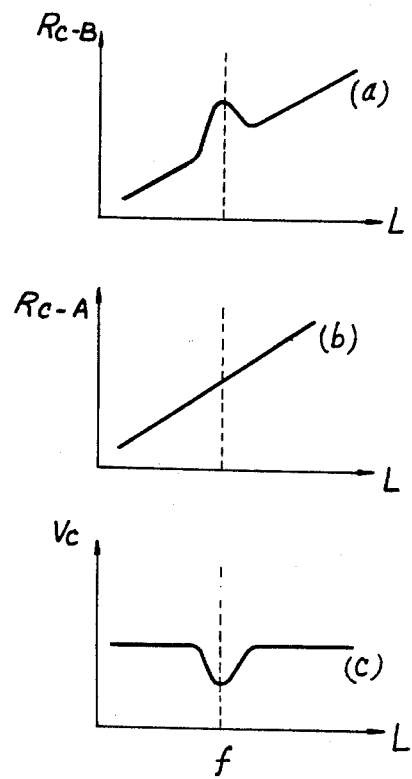
FIG. 11 has three graphs (a), (b), and (c) which respectively show relationships on which the present invention is based.

With respect to the dip effect, the resistance $R_{C-B}$ which varies due to receiving light through the light-transmitting means 8a without any diffusion provides a dip curve as shown by the graph (a) of FIG. 11. On the other hand, because of the presence of the light-diffusing means 8b, the resistance $R_{C-A}$ will vary as a result of the diffused light received thereby but will not form a dip, so that it has only the $1/L^2$ component as shown by the graph (b) of FIG. 11. As a result, a differential output $V_C$ without variation of the $1/L^2$ component is achieved as shown by the graph (c) of FIG. 11, this graph (c) of FIG. 11 resulting from a comparison of the outputs generated by the pair of photoconductive portions of FIG. 10. It is to be noted that graph (c) of FIG. 11 shows a curve formed by a dip component superimposed upon a DC bias component which depends upon the resistance ratio $R_{C-A}/R_{C-B}$.

When manufacturing elements of the above type which are to be exposed to light it is preferred for the sake of detecting efficiency to establish a relationship where $R_{C-A} = R_{C-B}$, so that these elements may always be used at the point where the detecting efficiency $\eta = 1$, but this latter feature is not absolutely essential.

Figure 12A:
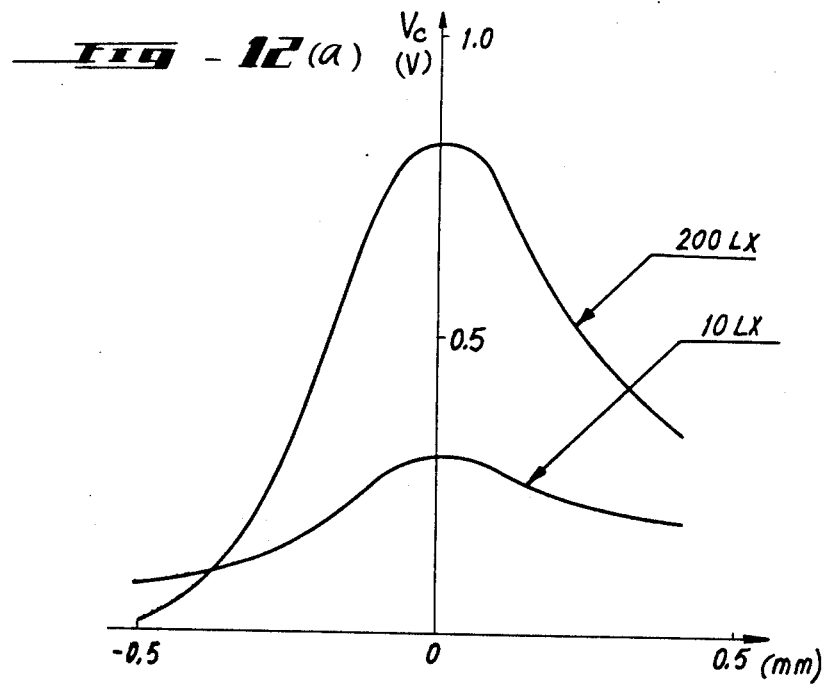
FIG. 12(a) is a graph demonstrating how with conventional devices variation in light intensity creates a considerable difference in results.
Figure 12B:
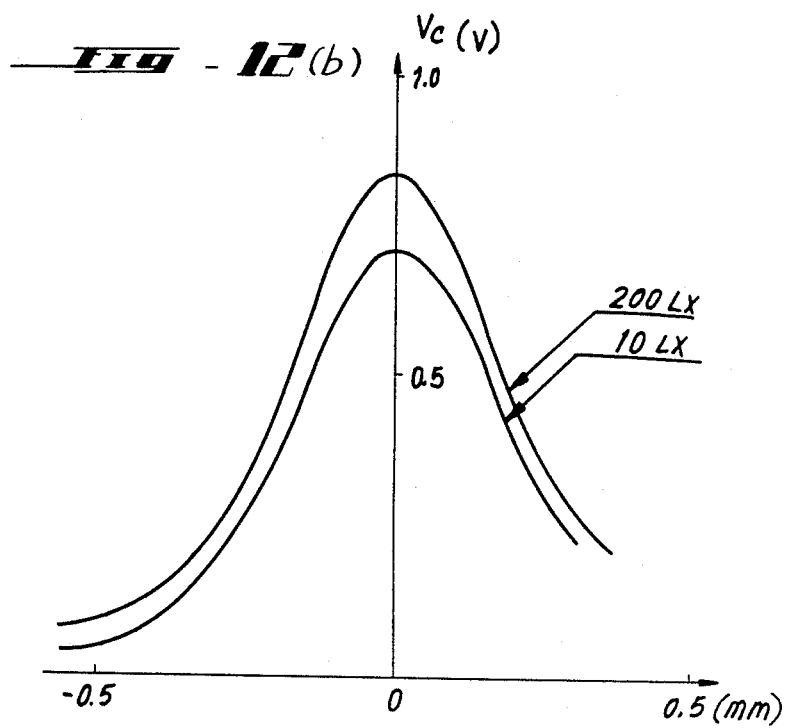
FIG. 12(b) illustrates how a variation in light intensity on the order of that of FIG. 12(a) will have substantially no influence with the present invention.

FIG. 12 (a) shows dip curves provided from measurement obtained from an arrangement as shown in FIG. 1 while FIG. 12 (b) shows dip curves provided by an arrangement as shown in FIG. 10. In FIGS. 12 (a) and 12 (b), the abscissa represents the distance L (mm) between the objective and the photoconductive means while the ordinate represents the voltage $V_C(v)$. The properly focussed point is selected to be provided at the location where the distance L originates. The illumination or light values indicated at the upper right portions of FIGS. 12 (a) and 12 (b) indicate the larger light intensity for the upper curves and the smaller light intensity for the lower curves. Thus, it is apparent from FIG. 12 (a) that the dip height varies considerably depending upon the illumination at the image plane, with the arrangement of FIG. 1, while FIG. 12 (b) shows that the dip height is kept substantially constant with the arrangement of FIG. 10 according to the present invention. Therefore, with the arrangement of the present invention the dynamic range of the processing circuit may be maintained relatively small, and the sensitivity of the focal adjustment detection may be maintained free of any noticeable variation. These features are extremely effective for achieving an accurate focal adjustment.

Figure 13:
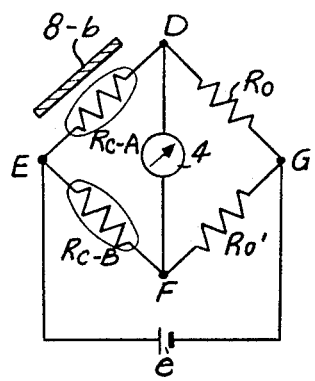
FIG. 13 is a wiring diagram of another embodiment of a detecting circuit of the invention utilizing the photoconductive means of the invention.

With the embodiment of FIG. 10, the $1/L^2$ component has no variation and thus remains as a constant value. FIG. 13 shows a further embodiment of a focal adjustment detecting circuit of the invention which takes the form of a bridge circuit which is constituted by utilizing the photoconductive means of the composite type according to the present invention so as to eliminate the $1/L^2$ component which remains as a constant value with the embodiment of FIG. 10. The arrangement of FIG. 13 is identical with that of FIG. 2 in that the bridge circuit is constituted by the elements $R_{C-B}$ and $R_{C-A}$ which are exposed to light, with these elements being connected with the resistances $R_o'$ and $R_o$, as illustrated. The resistances $R_{C-B}$ and $R_{C-A}$ of FIG. 13 have the variations as illustrated in graphs (a) and (b) of FIG. 11, respectively, depending upon the distance L between the objective and the composite photoconductive means, and the dip curve of FIG. 13 will correspond to that shown in graph (c) of FIG. 11, this latter curve exhibiting a voltage which can be seen at the galvanometer 4 of FIG. 13.

The embodiments of FIGS. 10 and 13 have certain differences, however. In the first place the arrangement of FIG. 13 has no DC bias component, as shown by FIG. 11 (c). In the second place, the arrangement of FIG. 10 maintains the detecting efficiency $\eta$ constant, while the arrangement of FIG. 13 cannot be free of variation of $\eta$, as is readily understood from the fact that the circuit arrangement of FIG. 13 is substantially identical with that of FIG. 2. Compared with the arrangement of FIGS. 2 and 3, however, the arrangement of FIG. 13 is highly advantageous in that no beam splitter is necessary. The bridge circuit of FIG. 13 may be formed by a single element which can be very conveniently situated in a small compact space and there is no light quantity loss due to the presence of a beam splitter. It is to be noted that the voltage at point D of the bridge circuit of FIG. 13 may be used as a signal for light measuring in the electrical circuit for achieving an automatic exposure or the like.

Figure 14:
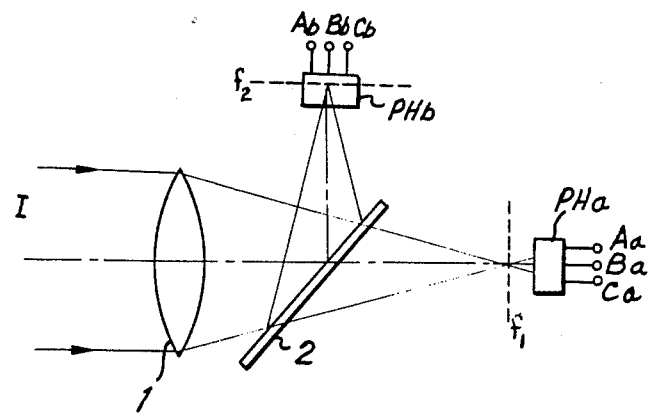
FIG. 14 is a schematic illustration of an optical system utilizing a pair of the photoconductive means of the present invention.

FIG. 14 shows a further embodiment of the invention, this particular embodiment being adapted to carry out detection of focal adjustment with an extremely high sensitivity. The incident light I after travelling through the objective 1 is split by the semi-transparent mirror 2 which forms a beam splitter, and with this embodiment there are a pair of composite photoconductive means PHa (having internal resistances $R_{Ca-Ba}'$ $R_{Ca-Aa}$) and PHb (having internal resistances $R_{Cb-Bb}'$ $R_{Cb-Ab}$). The result of the splitting of the beam provides the pair of focal plane $f_1$ and $f_2$ and it will be seen that the composite photoconductive means PHa is situated behind the focal plane $f_1$ while the composite photoconductive means PHb is situated in front of the focal plane $f_2$. The pair of photoconductive means of FIG. 14 include the electrodes Aa, Ba, Ca, and Ab, Bb, and Cb, as illustrated.

Figure 15:
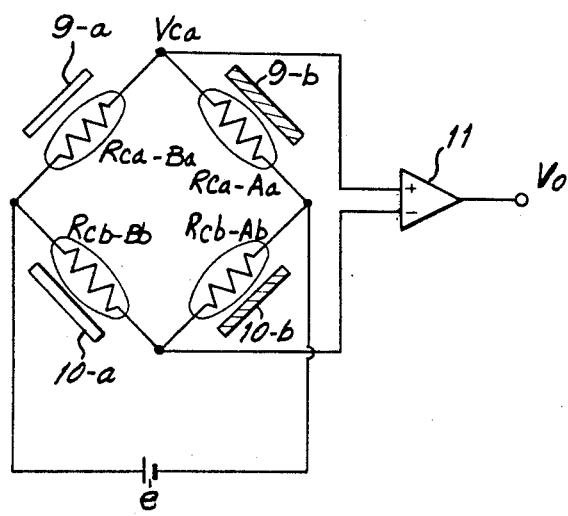
FIG. 15 is a wiring diagram used in connection with the optical system of FIG. 14.

FIG. 15 shows a bridge circuit utilized with the optical system of FIG. 14. A pair of light-transmitting means 9a and 10a are respectively used with the photoconductive portions of the pair of photoconductive means which have the resistances $R_{Ca-Ba}$ and $R_{Cb-Bb}$ as illustrated in FIG. 15, while a pair of light-diffusing means 9b and 10b are used with the remaining pair of photoconductive portions as illustrated in FIG. 15. A pair of opposed junctions of the bridge circuit of FIG. 15 are respectively situated between a pair of photoconductive portions of each composite photoconducitve means, and at these opposed junctions there are the voltages $V_{Ca}$ and $V_{Cb}$, and the points where these voltages are provided are electrically connected to a differential amplifier 11 which serves to compare these outputs. The voltage source e is connected to the remaining pair of junctions of the bridge circuit of FIG. 15, as illustrated.

Figure 16:
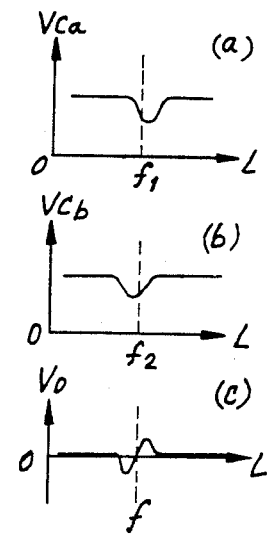
FIG. 16 includes three graphs (a), (b), and (c) which show the manner in which the embodiment of FIG. 14 and 15 operates.

FIG. 16 shows the outputs obtained from the respective terminals in the detection of dip effect utilizing the optical arrangement and the detecting circuit of FIGS. 14 and 15. Thus the output terminal voltage $V_{ca}$ and $V_{cb}$ of the respective composite photoconductive means have the variations illustrated in the graphs (a) and (b), respectively, of FIG. 16. There is a difference between these curves with respect to the distance L between the objective and the photoconductive means, corresponding to the lowermost point of the dip.

The application of both of these outputs to the differential amplifier 11 provides, therefore, the output $V_o$, as illustrated in the graph (c) of FIG. 16. The zero intersecting point of this curve corresponds to the proper focus $f$. Whether an object is front-focussed or rear-focussed may also be detected by determination of the polarity of the voltage $V_o$. Thus, this particular embodiment is characterized first by the so-called differential processing and provides a substantially higher sensitivity as compared to the other procedures for focal adjustment detection, and in the second place with the embodiment of FIGS. 14 and 15 there is nether a $1/L^2$ component or a DC bias component. Furthermore, with this embodiment there is a particular advantage, as compared to the known procedures, in that the detecting efficiency is maintained constant independent of the variations in light intensity. Therefore, this particular embodiment of the invention is extremely effective as a detector for an automatic focus adjusting device.

With the above embodiment of FIGS. 14–16, each photoconductive means will detect image information at its particular location which is different from the image information detected by the other photoconductive means, but this difference will present no particular problem inasmuch as the particular photoconductive portion which receives the diffused light is only required to detect the rate of light intensity variation.

As is apparent from the above description, the detector according to the present invention will function in such a way that an automatic focus adjusting device can be achieved with the detecting efficiency maintained constant independent of variations in light intensity. The detector according to the invention is highly advantageous in that a detection signal of higher stability is provided, as compared with detection signals which can be achieved with prior art structures and methods, inasmuch as the pair of photoconductive portions of the composite photoconductive means are assembled into an integral assembly and are used in the manner of a homogenous resistor in the embodiment of FIG. 10, as compared to the known arrangements where a photoconductive means and a load resistance are connected to each other with each of the latter components having temperature characteristics and various electrical characteristics which are different from each other. Thus, both of the resistances $CdS_{CA}$ and $CdS_{C-B}$ have identical variations according to factors such as temperature, which may change the physical properties of the CdS photoconductive means, so that with the present invention no unbalance will occur between both photoconductive means and a stabilized detection signal is achieved.

Although detection by a well known bridge circuit, as shown by FIG. 2, has similar advantages, this known bridge circuit of FIG. 2 employs a pair of separately constructed photoconductive means so that it is difficult to make the various characteristics of both of these means coincide with each other, and therefore this construction cannot be very effective in practice. An extremely high effectiveness is achieved, however, to a remarkable extent with the construction of the present invention, inasmuch as the CdS photoconductive means is a substance which has extremely delicate properties and depends with extremely great sensitivity on the particular manufacturing conditions as well as the ambient operating conditions.

Thus, with the present invention the following features and advantages are provided:

1. The device of the invention may be constructed by utilizing simple circuits and the detecting efficiency may be maintained constant over a wide range of light intensity (although the detecting efficiency will vary with an embodiment as shown in FIG. 13).

2. The device of the invention may be built into an extremely compact apparatus such as a photographic camera inasmuch as the space required for the installation is small inasmuch as with an embodiment as shown in FIG. 10, for example, only a single composite photoconductive means forms a single element which is required to be exposed to light.

3. With the present invention it is possible to eliminate light loss inasmuch as a beam splitter is not required.

4. The device of the invention provides a stabilized detection signal inasmuch as the integrally assembled elements are exposed to light.

Thus, with the present invention a low-cost detector is provided with the possibility of achieving a stabilized detection signal of high sensitivity independently of ambient conditions, including the light intensity. As will be apparent to those skilled in the art, a suitable servo-amplifier or servo-motor may be connected to the detecting station of the present invention to provide an automatic focussing of the optical system.

What is claimed is:

1. For use in the focalizing of an optical system which has a focal plane, composite photoconductive means situated at the region of said focal plane and including a pair of photoconductive portions, a substrate carrying said photoconductive means, a light-diffusing means situated in front of one of said photoconductive portions for diffusing light which reaches said one photoconductive portion, light-transmitting means situated in front of the other of said photoconductive portions for transmitting non-diffused light thereto, whereby said photoconductive portions generate separate photoelectric outputs in response to diffused and non-diffused light impinging respectively on said one and said other of said photoconductive portions, and electrical means electrically connected with said photoconductive portions for comparing said outputs thereof to detect from said comparison of said outputs the focal adjustment of said optical system, said photoconductive means including for said pair of photoconductive portions thereof a pair of electrodes and a common electrode therebetween, said electrodes all being separate from each other while said pair of electrodes which respectively form said pair of photoconductive portions are situated in a common plane at a surface of said photoconductive means.

2. The combination of claim 1 and wherein said pair of photoconductive portions are connected in series while said electrical means is connected electrically to a junction between the series-connected photoconductive portions with said junction serving as a terminal for detecting focal adjustment, whereby the efficiency of the detection of focal adjustment may be maintained constant independently of variation of light intensity.

3. The combination of claim 1 and wherein said photoconductive portions of said photoconductive means are respectively situated at adjoining legs of a bridge circuit which further includes a pair of resistors respectively connected in series with said pair of photoconductive portions in a second pair of adjoining legs of said bridge circuit, respectively, said bridge circuit having one pair of opposed junctions respectively situated between said resistors and said photoconductive portions and including a galvanometer electrically connected between the latter pair of junctions, while said bridge circuit has a second pair of opposed junctions respectively situated between said photoconductive portions and between said resistors, and a voltage source electrically connected to the second pair of opposed junctions of the bridge circuit.

4. The combination of claim 1 and wherein all of said electrodes are arranged along concentric circles.

5. The combination of claim 1 and wherein all of said electrodes are arranged in a comb pattern.

6. The combination of claim 1 and wherein said common electrode is situated on one side while the other electrodes are situated on the opposite side of said photoconductive means with the latter forming a sandwich between said common electrode and the other electrodes.

7. The combination of claim 1 and wherein said optical system includes a beam splitter providing the optical system with a pair of focal planes and a pair of said photoconductive means being respectively situated in the regions of said focal planes with one of said pair of photoconductive means situated in front of one of said focal planes while the other of said photoconductive means is situated behind the other focal plane, and said electrical means being electrically connected with the outputs of said photoconductive portions of said pair of photoconductive means for detecting when a given image is properly focussed or is front-focussed or rear-focussed.

8. The combination of claim 7 and wherein said photoconductive portions are arranged in a bridge circuit having one pair of opposed junctions situated between the pair of photoconductive means and a second pair of opposed junctions situated between the photoconductive portions of said pair of photoconductive means, said electrical means including a differential amplifier electrically connected between said second pair of junctions, and a voltage source electrically connected between said one pair of opposed junctions.

* * * * *